US 6,626,039 B1

(12) United States Patent
Adams et al.

(10) Patent No.: US 6,626,039 B1
(45) Date of Patent: Sep. 30, 2003

(54) ELECTRICALLY DECOUPLED SILICON GYROSCOPE

(75) Inventors: Scott G. Adams, Ithaca, NY (US); James Groves, Endicott, NY (US); Donato Cardarelli, Medfield, MA (US); Raymond Carroll, Boxford, MA (US); Charles R. Dauwalter, Newton Highlands, MA (US)

(73) Assignee: MilliSensor Systems and Actuators, Inc., West Newton, MA (US)

( * ) Notice: Subject to any disclaimer, the term of this patent is extended or adjusted under 35 U.S.C. 154(b) by 162 days.

(21) Appl. No.: 09/660,740

(22) Filed: Sep. 13, 2000

Related U.S. Application Data

(60) Provisional application No. 60/154,631, filed on Sep. 17, 1999.

(51) Int. Cl.[7] ................................................ G01C 19/02
(52) U.S. Cl. ........................ 73/504.04; 73/504.08; 73/504.11; 73/510; 73/514.02
(58) Field of Search ................... 73/504.04, 504.01, 73/504.02, 504.03, 504.08, 504.09, 504.12, 510, 514.32, 514.24

(56) References Cited

U.S. PATENT DOCUMENTS

| | | | | |
|---|---|---|---|---|
| 5,195,371 A | | 3/1993 | Greiff | 73/505 |
| 5,284,059 A | | 2/1994 | Wan | 73/505 |
| 5,349,855 A | | 9/1994 | Bernstein et al. | 73/505 |
| 5,488,862 A | | 2/1996 | Neukermans | 73/504.02 |
| 5,533,395 A | | 7/1996 | Wan | 73/504.01 |
| 5,555,765 A | | 9/1996 | Greiff | 73/504.09 |
| 5,659,195 A | | 8/1997 | Kaiser et al. | 257/415 |
| 5,691,470 A | * | 11/1997 | Sapuppo et al. | 73/504.02 |
| 5,712,426 A | * | 1/1998 | Sapuppo et al. | 73/504.03 |
| 5,908,986 A | | 6/1999 | Mitamura | 73/504.12 |
| 5,911,156 A | * | 6/1999 | Ward et al. | 73/504.16 |
| 5,915,275 A | | 6/1999 | Cardarelli et al. | 73/504.03 |
| 5,952,572 A | | 9/1999 | Yamashita et al. | 73/504.04 |
| 5,955,668 A | | 9/1999 | Hsu et al. | 73/504.12 |
| 5,992,233 A | | 11/1999 | Clark | 73/514.35 |
| 5,998,906 A | | 12/1999 | Jerman et al. | 310/309 |
| 6,067,858 A | | 5/2000 | Clark et al. | 73/504.16 |
| 6,305,222 B1 | * | 10/2001 | Johnson et al. | 73/504.12 |
| 6,308,567 B1 | * | 10/2001 | Higuchi et al. | 73/504.12 |

OTHER PUBLICATIONS

Geiger, W. et al, 1998, New designs of micromachined vibrating rate gyroscopes with decoupled oscillation modes, Sensors and Actuators, A 66, 118–124.

* cited by examiner

Primary Examiner—Hezron Williams
Assistant Examiner—Jacques Saint-Surin
(74) Attorney, Agent, or Firm—Brown & Michaels, PC

(57) ABSTRACT

An oscillatory gyroscope is described with decoupled drive and sense oscillators and reduced cross-axis sensitivity. The gyroscope is fabricated using a plasma micromachining process on standard silicon wafers. The electrical isolation of the drive and sense functions of the gyroscope, contained within the same micromechanical element, reduce cross-coupling while obtaining high inertial mass and high sensitivity.

54 Claims, 11 Drawing Sheets

ELECTRICALLY DECOUPLED SILICON GYROSCOPE

REFERENCE TO RELATED APPLICATIONS

This application claims an invention which was disclosed in Provisional Application No. 60/154,631, filed Sep. 17, 1999, entitled "ELECTRICALLY DECOUPLED SILICON GYROSCOPE". The benefit under 35 USC §119(e) of the United States provisional application is hereby claimed, and the aforementioned application is hereby incorporated herein by reference.

BACKGROUND OF THE INVENTION

Currently there is considerable interest in the development of low-cost, reliable gyroscopes and researchers have proposed a variety of solutions to meet that challenge. Traditional military-grade gyroscope fabrication techniques are not scalable to high volume manufacturing or low production cost. The field of Micro Electro Mechanical Systems (MEMS) utilizes semiconductor fabrication techniques to construct microscopic mechanical systems, and hence provides the manufacturing model for low-cost inertial sensing systems. A variety of researchers have pursued MEMS gyroscope designs using a multiplicity of design and fabrication methods.

However, miniature gyroscopes have numerous technical obstacles related to the assembly and mass limitations of silicon-based elements. Some of the obstacles include small inertial masses, minute sense signals, and high volume packaging methods. To reduce electrical coupling, complicated circuit techniques have been developed to separate the drive and sense signals. To provide more angular momentum, researchers have developed specialized drive methods. To increase the sense signals, resonance matching and high Q oscillators effectively boost the system gain. However, it has previously been difficult to obtain many of the favorable operating parameters in a single device that is manufacturable in high volumes.

What is presented here is a silicon gyroscope that solves many of the inherent difficulties in the prior art to create a high performance device in a highly manufacturable fabrication sequence. The gyroscope requires no special materials or packaging in order to fabricate the device in high volumes. By simultaneous mechanical and electrical decoupling of the drive and sense oscillators, the requirements for complex signal processing and high gain oscillators are alleviated. Patented fabrication techniques impart unique features to the gyroscope device and enable a wide design window for tuning the gyroscope performance.

The gyroscope of the present invention differs from prior art in the manner in which it decouples, both electrically and mechanically, the drive and sense oscillators. The gyroscope of the present invention is also unique in that all the electrical drive and sense signals are integrated directly onto the released MEMS element, and not dependent upon substrate or buried electrodes in order to route electrical signals to the external package. This facilitates the electronics design, removes difficult processing and alignment steps, and ultimately allows industry standard packaging solutions to enable high volume manufacturing.

Micromachined gyroscopes commonly use oscillating rather than rotating members due to the obstacle that friction imposes at micron dimensions. Many gyroscopes rely on complex motion of a single resonating member to transduce angular rate. In so-called tuning fork designs, for example in U.S. Pat. No. 5,349,855 (Bernstein, et al) and U.S. Pat. No. 5,992,233 (Clark, et al), a micromachined device is resonated in plane and undergoes complex motion when subjected to gyroscopic torque. The angular rate is deconvolved using multiple electrode structures, complex vibrational modes, and clever signal processing. Nevertheless, the difficulty in these arrangements is the inherent mechanical coupling of the drive member with the sense member. In other words, the single mechanical oscillating structure results in high levels of electromechanical cross talk, manifested in high quadrature signals in the output electronics.

Substantial decoupling of the mechanical motions for drive and sense have been accomplished through the use of oscillating mechanical elements. In U.S. Pat. No. 5,555,765 (Greiff) and U.S. Pat. No. 5,955,668 (Hsu et. al), a single mechanical member is oscillated using rotationally symmetric drive electrodes. Subsequent gyroscopic motion transmits the Coriolis force into a second distinct rotational mode. In both patents, this sensing mode is transduced using buried electrodes beneath the micromechanical structure. Although markedly reducing the mechanical complexity, these devices require multi-level processing and typically limit the fabrication to thin-film materials, reducing overall sensitivity. Another implementation of decoupled mechanical designs is revealed by Geiger, et. al in "New Designs of Micromachined Vibrating Rate Gyroscopes with Decoupled Oscillation Modes." Again, the oscillating rotating member serves to energize the gyro but a buried electrode is required to transduce the output motion. All of these planar oscillating gyroscopes can be arranged into a number of configurations, each sensitive to gyroscopic input along a different axis. The orthogonal modes of rotationally oscillating gyroscopes are detailed in Cardarelli, et. al in U.S. Pat. No. 5,915,275.

None of the prior art, however, incorporate decoupled mechanical operation with the ability to electrically isolate the drive and sense signals on the same, released mechanical structure. Such a device is capable of substantially reducing cross coupling, both mechanical and electrical, improving the quality of the output signals and reducing the requirements for precision electrical transduction or difficult signal processing. It is the object of the present invention to provide such a device within the context of a highly manufacturable silicon MEMS process.

SUMMARY OF THE INVENTION

The invention is a micromachined planar oscillatory gyroscope with electrical and mechanical decoupling. Electrical decoupling relates to the ability to construct multiple electrically isolated regions within one mechanically connected structure. Mechanical decoupling refers to the physical mode separation of the drive and sense functions. Together these two forms of decoupling reduce electromechanical cross-talk, a major contributor to the zero rate output and zero rate output shift over temperature. In addition, the electrical decoupling greatly simplifies the sensing electronics.

The gyroscope of the invention is fabricated with a single-crystal silicon based fabrication technology. The dry etch process begins with a standard silicon wafer, out of which high-aspect ratio structures are sculpted. The high-aspect-ratio nature of the process, with device depths on the order of 10–50 $\mu$m and stress-free silicon material, lends itself to the creation of large planar structures several millimeters (mm) in diameter that are ideal for inertial sensing. Large structures are the key to reducing the thermomechanical noise and enabling larger capacitances for improved device sensitivity. The silicon beam structures formed by the process can be tuned for appropriate operation of the gyroscope across wide ranges, and the mass inherent in deep silicon etching improves the resolution achievable by an order of magnitude.

The invention dictates unique electrical connections, crossovers, and actuator mounting methods in order to provide the mechanical decoupling and electrical isolation. The gyroscope is connected to external metal traces and bond pads by means of flexible electrical leads that permit the mechanical member to be encapsulated and protected from the environment. Within the gyroscope itself, one layer of metal is used to route all electrodes, and novel crossover structures are incorporated within the released mechanical element. This capability of arbitrary electrical routing within the gyroscope allows differential measurement for sense capacitors and enhanced efficiency from the capacitive actuators. This segmentation of the design significantly reduces crosstalk between the drive and the sense functions.

The present invention provides design freedom to maintain overall system stability over vibration and temperature by separating the drive and sense frequencies of oscillation. Also, the gyroscope can be operated at modest vacuum using standard sealing materials without the need for expensive getters or vacuum assemblies. The stability presented by the solution is sufficient for packaging in industry standard plastics and operation over automotive-grade temperature ranges.

Because of the reduced electrical and mechanical coupling, the circuit functions required by the gyroscope are easily incorporated into discrete analog components or switched capacitor integrated circuits. The circuit functions are reduced to driving the active member, controlling its amplitude, and detecting the sensing member by means of capacitive electrodes.

Multiple configurations of the gyroscope are possible by rearranging the drive, sense, and input axes to accommodate different configurations. Ultimately, this enables multiple axis configurations within a single package or a full three-degree-of-freedom rate sensing unit.

BRIEF DESCRIPTION OF THE DRAWINGS

FIG. 2c is a slightly enlarged Scanning Electron Microscope photograph of a silicon gyroscope, showing the area delineated in box "2c" in FIG. 2a.

DETAILED DESCRIPTION OF THE INVENTION

Referring to FIGS. 1, 11a, 11b, and 12, the invention is a planar oscillating gyroscope, microfabricated on a silicon wafer.

Overview of Gyroscope Components and Operation

The gyroscope is made up of an outer silicon substrate or case (5), a drive member named the rotor driven member (RDM)(2), a sense element named the torque summing member (TSM) (3), and an inner silicon substrate case (1), arranged concentrically (the inner and outer cases being part of the same silicon wafer). The RDM (2) and TSM (3) are thus suspended within a "doughnut shaped" well in the substrate, as will be detailed below, with the inner case (1) forming the "doughnut hole" and the outer case (5) surrounding the "doughnut".

Figure 3:
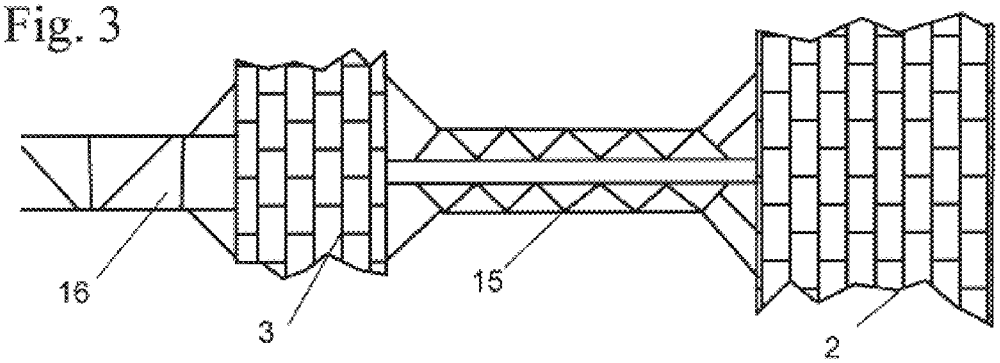
FIG. 3 shows details of an embodiment of the RDM torsional flexure of the gyroscope of the invention.

The RDM (2) is an annular ring in form, and flexibly mounted to the TSM (3) with RDM torsional flexures (15). The RDM flexures are torsionally compliant and permit motion about a spin axis (43) defined by the orientation of the RDM flexures (15). The RDM flexures reject motion relative to the TSM (3) about all other axes, rotational and translational. The RDM flexures (15) are also shown in FIG. 3. The RDM is driven to oscillate sinusoidally in angle about the spin axis (43). Preferably, the RDM is driven at its resonant frequency to maximize the RDM's amplitude of motion. The RDM oscillation establishes the angular momentum of the gyro.

The TSM (3) is also an annular ring in form and is, in turn, flexibly mounted to the inner case (1) with TSM flexures shown generally as (18). Due to the radial arrangement of the flexures and the high-aspect ratio of the beams used to make the flexures, motion of the TSM is constrained about a rotational axis pointing out of the plane referred to as the output axis (45). Having a TSM that rejects motions other than rotations about the output axis is important. Otherwise the off-axis input rates, linear acceleration input, and the RDM motion may couple into the output of the gyroscope and corrupt the sensor's output.

Figure 11A:
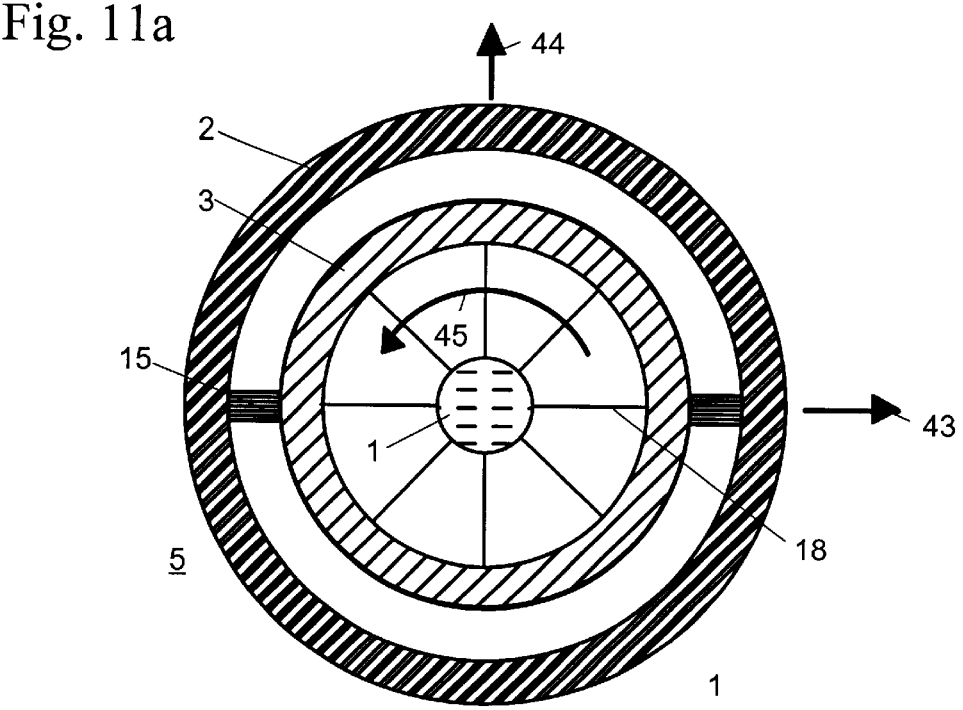
FIG. 11a shows a top view of a simplified gyroscope diagram. The spin and input axes are also included in this figure.
Figure 11B:
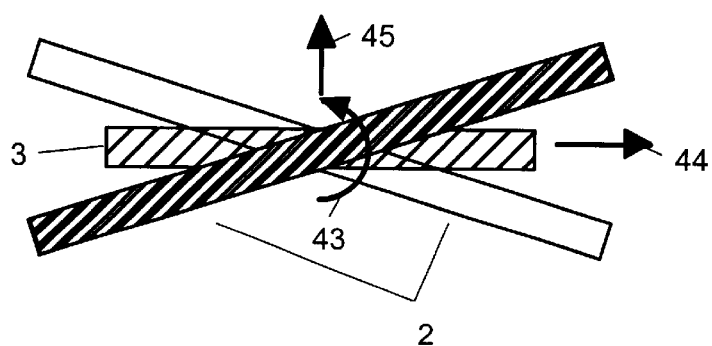
FIG. 11b shows a side view of the simplified gyroscope diagram of FIG. 11a, with the RDM rotated to indicate the type of motion that it undergoes during operation.
Figure 12:
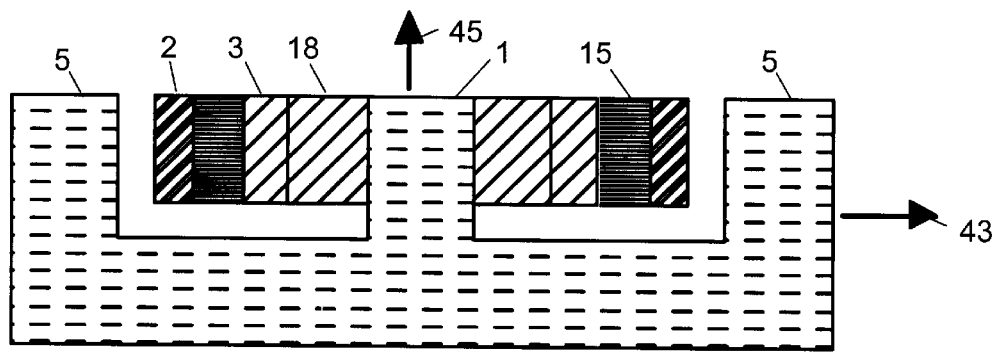
FIG. 12 shows a cut view of the gyroscope.

In the configuration shown in FIGS. 11a, 11b, and 12, the gyroscope is designed to be sensitive to rotation rates about the input axis (44). When the gyroscope case is at rest and the gyroscope is in operation, the RDM is driven at its resonant frequency by supporting circuitry which will be discussed later. The oscillating RDM provides the necessary angular momentum for the gyroscope operation. The TSM that supports the RDM should be at rest. Due to conservation of angular momentum, when the gyroscope case is rotated about this input axis, the oscillating RDM transmits a corresponding oscillating Coriolis torque to the TSM about the output axis (45). This periodic torque causes the TSM to oscillate. The amplitude of this TSM motion is proportional to the rate of rotation and serves as the output mechanical signal to be measured by the electronics. By capacitively sensing the motion of the TSM and performing the appropriate amplitude demodulation, one obtains the electrical output signal that is proportional to the rate of rotation about the input axis.

Detailed Discussion of the Gyroscope Components

Figure 1:
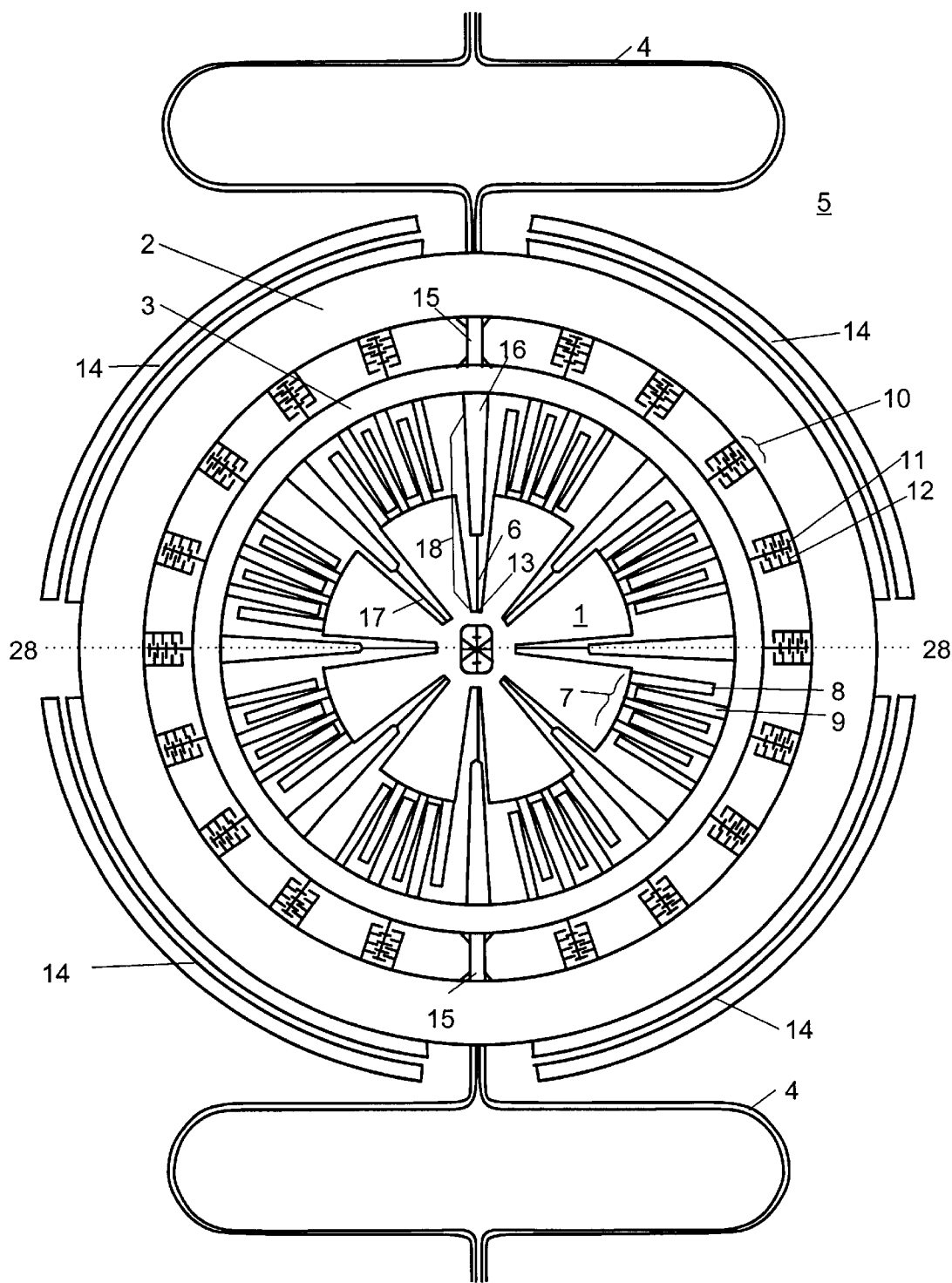
FIG. 1 shows a simplified diagram of the gyroscope components of the present invention.
Figure 2A:
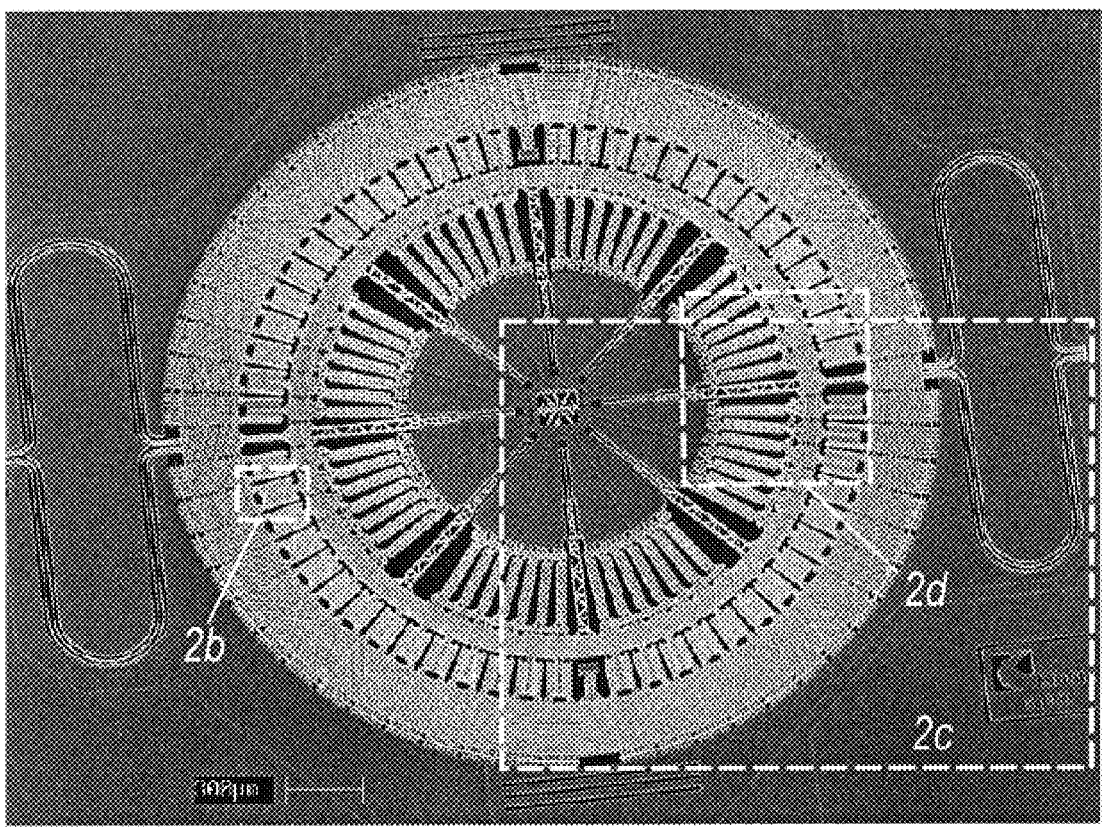
FIG. 2a shows a Scanning Electron Microscope photograph of a silicon gyroscope built according to the teachings of the present invention.
Figure 2B:
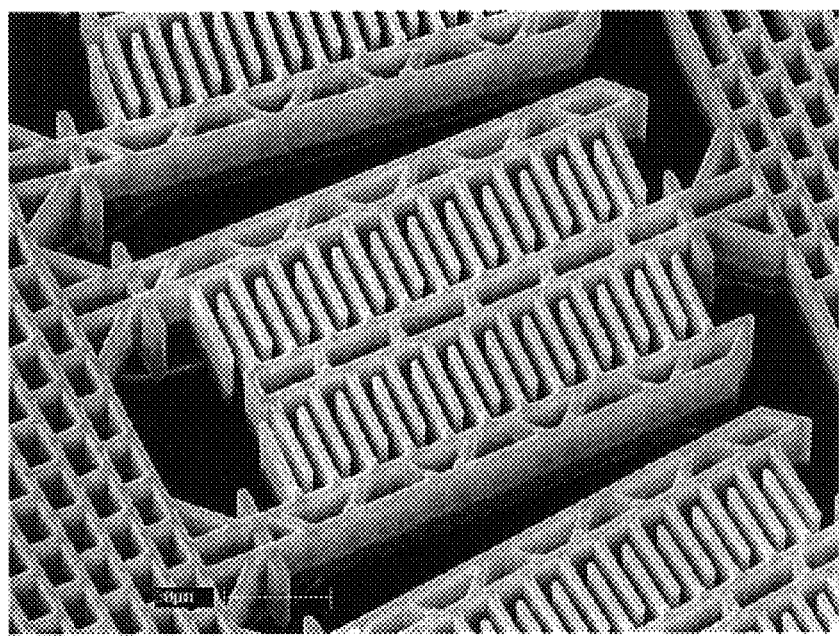
FIG. 2b shows a Scanning Electron Microscope photograph of a portion of a silicon gyroscope, showing the area delineated in box "2b" in FIG. 2a, enlarging details of the RDM drive electrodes.

The RDM (2) is driven to oscillate torsionally about the spin axis by the RDM drive levitation actuators (10), which are, in the preferred embodiment, located around the inner circumference of the RDM (2), between the RDM (2) and TSM (3). These actuators are a form of symmetrical comb actuators. FIG. 2b shows a close-up SEM photograph of one of the RDM drive actuators of the preferred embodiment. As can be seen in that photo, and in the drawing of FIG. 1, each actuator (10) is made up of a pair of comb-like sections, one (12) mounted to the RDM (2) and the other (11) to the TSM (3). They do not produce net forces in the plane of the gyroscope. They only produce levitation forces in the out-of-plane direction, also referred to as the output axis (45). The embodiment of FIG. 1 shows 18 such actuators (10), spaced evenly around the gap between the RDM (2) and TSM (3), with two of the actuator positions replaced by the RDM flexures (15). In the preferred embodiment of the invention, referred to in FIG. 2c, two additional RDM actuator positions are replaced by structures of similar shape to the RDM flexures in order to inertially balance the gyroscope. These structures (19) are referred to as inertial balance structures. Other numbers of RDM drive actuators (10) would be possible within the teachings of the invention, so long as there were symmetrical sets of actuators on each side of a line joining the RDM flexures (15).

The plurality of RDM actuators are grouped into two groups. The RDM actuators on one side of a hypothetical line joining the RDM flexures are in one group and those on the other side are in the second group. Each group is referred to as half of the RDM actuator. By alternately applying voltage to the two halves at the RDM's resonant frequency, the RDM will oscillate with a large amplitude.

One of the novel features of the invention is the mounting of the RDM actuator electrode pairs (11) and (12). Most actuators in the literature have one electrode mounted to a movable structure and the other to a case. In the present invention, both electrodes are mounted to one mechanically connected movable structure, the TSM plus the RDM. This arrangement decouples the actuation from the case. Motion of the TSM then no longer affects the drive of the RDM because the RDM is mounted to and moves with the TSM. In summary the electrical isolation provided by the fabrication technology translates into an electro-mechanical decoupling of the sense motion of the TSM and the drive actuation of the RDM. This decoupling virtually eliminates another source of crosstalk that confounds the output signals of gyroscopes.

Other electrostatic actuators such as comb drives or parallel-plates could be used to drive the RDM depending on the gyroscope configuration being employed.

Figure 4:
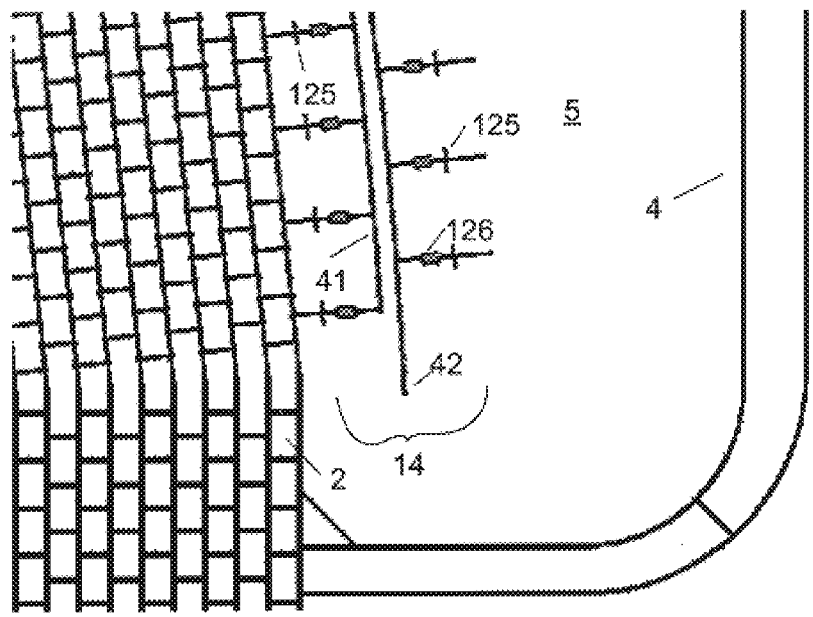
FIG. 4 shows details of an embodiment of the RDM sense electrodes of the gyroscope of the invention.

Motion of the RDM (2) is sensed by sense capacitors (14) around the outer circumference of the RDM (2) and the inner circumference of the well in the case (5). FIG. 1 shows the use of four such sense capacitors (14), in quadrants. Other numbers of sense capacitors could be used, if desired. As detailed in FIG. 4, each sense capacitor (14) consists of two concentric arc-shaped electrodes—one electrode (41) mounted to the RDM (2), and the opposing electrode (42) mounted to the case (5). Also shown in FIG. 4 are isolation joints (125) that isolate capacitors (14) and vias (126) that permit electrical contact to (14). This sense capacitor geometry senses out-of-plane motion. When the RDM rotates about the spin axis, one electrode of this sense capacitor pair moves out-of-plane, while the other one remains fixed. This relative motion produces a capacitance change that can be sensed electrically and translated into a measure of the motion. A novelty of this design is that if the RDM is also rotated about the output axis via a rotation of the TSM, the measurement of the out-of-plane motion is not affected. The reason for this insensitivity to the TSM motion comes from the rotational symmetry of the arc shaped sense capacitors. As long as the rotations of the TSM during normal operation are small, the sense capacitor capacitance is insensitive to TSM rotations.

Two design variations could be implemented for the RDM sense capacitor. It is possible to mount one electrode of this concentric arc sense capacitor on the TSM and the other on the RDM. For electrode routing reasons we chose not to do so in this preferred embodiment. Also, since actuators can be used as sense capacitors, it is possible to use some of the RDM actuators (10) as sense capacitors and some as actuators. In doing so, all references to the case can be eliminated thereby further decoupling the operation of the device from the TSM's motion relative to the case. Furthermore, since the converse is true also, sense capacitors can be used as actuators, the concentric arc design for RDM sensor (14) could be used as an actuator.

Referring to FIG. 1, the preferred TSM flexures have a structure which has a larger outer section (16) mounted to the TSM (3), tapering to a thin inner section (6) which attaches to the inner case (1) at anchor points (13). As can be seen in FIG. 1, it is preferred that the inner case (1) be formed with radial slots (17) within which the TSM flexures (16) and (6) may fit, with the anchor points (13) at the innermost point on the radial slot (17). The larger outer section (16), the inner section (6), and the radial slots (17) permit sufficient length and proper positioning of the TSM flexures to allow for needed flexibility.

In the preferred embodiment, the bending stiffness of the TSM's flexures about the output axis is partially due to the bending stiffness of the beams and partially due to an axial stiffness introduced by the composite nature of the beams. During fabrication, oxide layers are deposited or grown on the silicon beams. There is a temperature difference between the fabrication temperature and the operating temperature of the device. Because the beams are constructed from multiple materials with differing coefficients of thermal expansion, some net axial stress remains. This axial stress manifests itself in the TSM flexures as a tensile stress which positively contributes to the overall stiffness of the TSM about the output axis. The arrangement of the TSM and the location of the TSM flexure connections to the substrate determine that the TSM flexures will be in tension. Using other arrangements, the TSM flexures could be put into compression causing them to buckle and fail.

Figure 5:
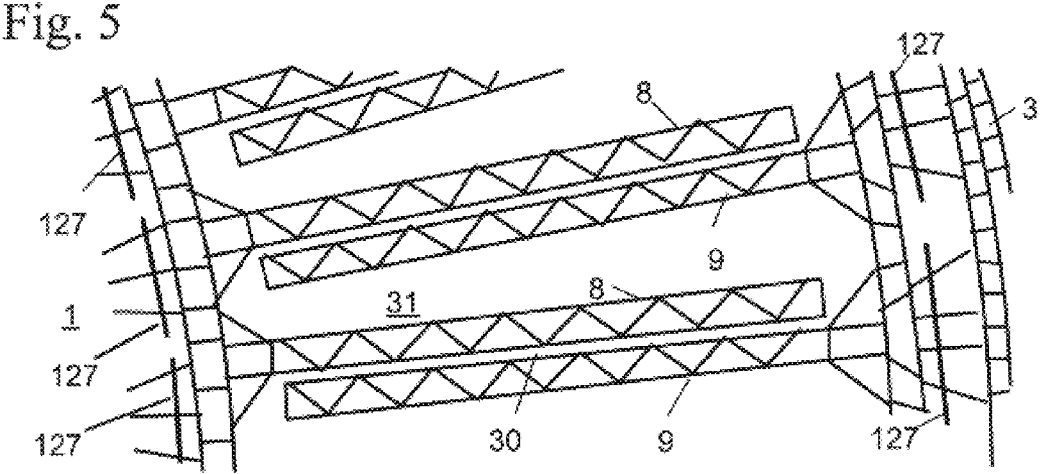
FIG. 5 shows details of an embodiment of the TSM sense capacitor of the gyroscope of the invention.

The capacitors (7) used to sense the motion of the TSM (3) motion are in the form of sets of parallel-plates radially arranged in the annular gap between the TSM (3) and the inner case (1). One set of plates (8) of the sensor is attached to the substrate (1) and the other set (9) is attached to the TSM (3). Isolation joints (127) electrically isolate the capacitors (7) from the surrounding silicon. As shown in detail in FIG. 5, the sensor arms have two gaps, one large (31) and one small (30). Sensing is accomplished between the plates (8) and (9) across the small gaps (30). In this arrangement, the large gap (31) is needed in order to produce a net capacitance change with motion. Shown in FIG. 5 is only a small number of the total used to sense motion.

FIG. 1 shows a line (28) that divides the gyroscope in half On one side of the line (28) the TSM capacitors (7) are arranged to produce an increase in capacitance when the TSM rotates about the output axis in the positive direction. On the other side of the line (28) the TSM capacitors (7) are arranged to produce a decrease in capacitance when the TSM rotates about the output axis in the positive direction. By finding the difference between the cumulative sum of all the TSM capacitors (7) on each side of the line (28), a differential capacitance measurement of the motion is performed. To facilitate the measurement, all of the TSM sense capacitors (7) on a particular side of line (28) are connected together in parallel.

In general, sense and actuator capacitors that perform the same function are connected together in parallel. This statement holds true for the RDM drive capacitors, RDM sense capacitors, and TSM sense capacitors. Later, in the description of the gyroscope electronics, the TSM sense capacitors will be referred to as having two halves. These two halves refer to the parallel connection of the TSM sense capacitors on each side of the line (28). One half increases its capacitance with a positive rotation of the TSM, the other decreases. Between the two, a differential measurement can be performed by the circuitry.

Using the isolation technology it is also possible to interleave the TSM sense capacitors in a configuration that performs differential measurements on a smaller scale than between the two halves of the gyroscope divided by the line (28). It is possible to electrically split the capacitor plates (8) into two separate plates such that differential measurements are taken between the clock-wise and counter-clockwise sides of each plate (9). In this modification, the gyroscope's resistance to linear acceleration signals is increased by increasing the level at which differential motion is measured.

In order to connect from the bonding pads along the outer edges of the silicon die to the gyroscope, flexible electrodes called flex leads (4) are preferably used. In previous versions of the gyroscope, the bonding pads were placed on the case (1) region and wires were run along the TSM flexures (18) to make electrical connections to the rest of the device. In order to make the device hermetic, the electrical leads need to be run exterior to the gyroscope. In the present invention, flex leads (4) provide this function without the need of special processing steps or specialized wafers as a starting material. Examples of these flex leads are shown in FIG. 1, 4, and in the SEM photographs of FIGS. 2a and 2c. In the examples shown, metal runs along the top of the silicon beams that form the flex leads. A dielectric layer on the order of 1000 nm thick separates the silicon and the metal. The large loop design of the flex leads reduces the stiffness imparted to the motion of the RDM and TSM. One variation on this design is to use the silicon as the electrical conductor in the flex lead. The actual shape of the flex lead is not as important as the function. The function is to provide a flexible electrical connection between the gyroscope and the wires and bondpads located on the case (5).

The flex leads enable the sensor element to be encapsulated and hence protected from the environment during packaging and operation. Preferably, the sensor is encapsulated by means of a silicon lid bonded to the element substrate with a frit glass seal.

Figure 2C:
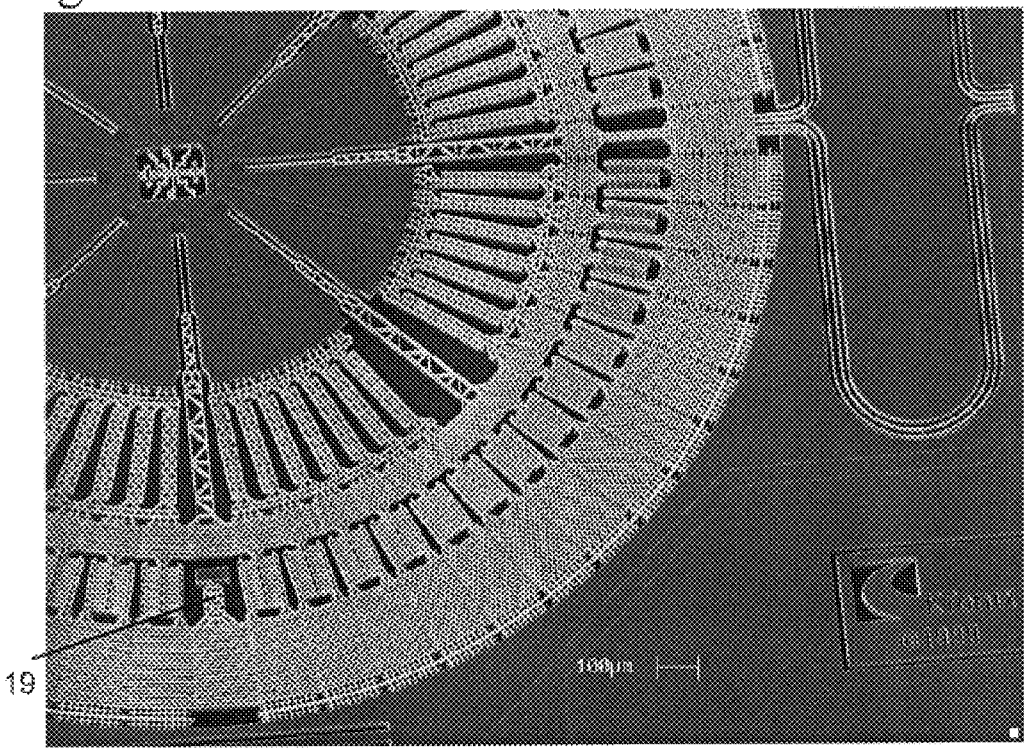
Figure 2D:
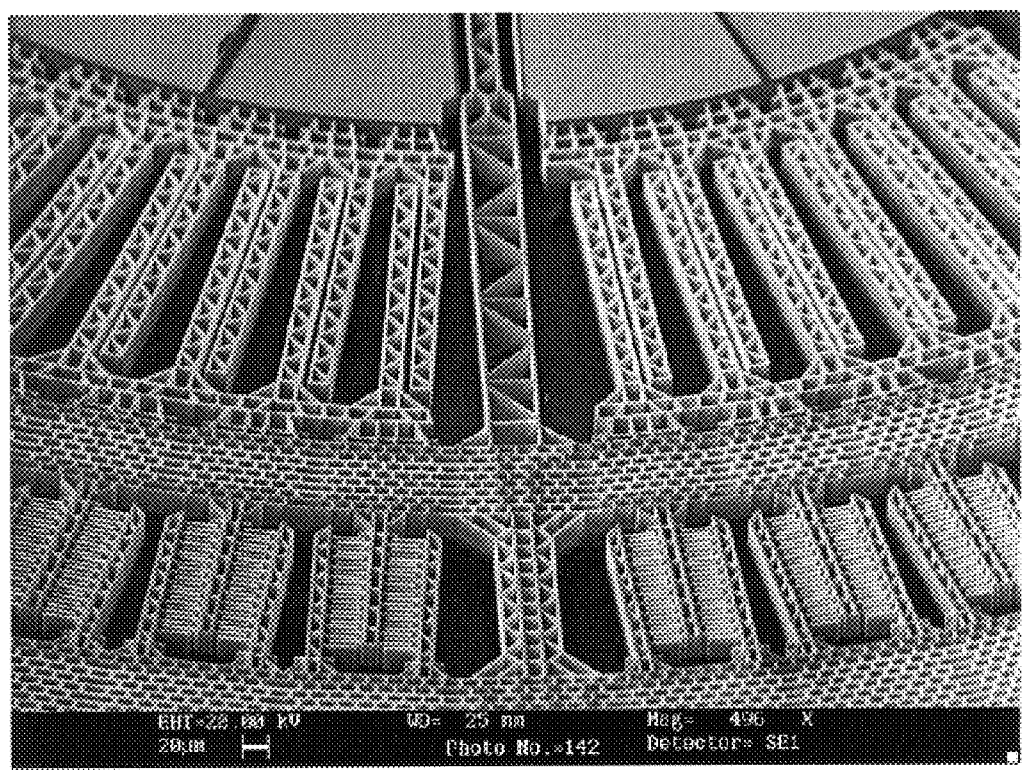
FIG. 2d shows a Scanning Electron Microscope photograph of a silicon gyroscope, showing a close-up area delineated in box "2d" in FIG. 2a rotated by 90 degrees, enlarging details of the TSM transducers, RDM drives and RDM flexure.

FIGS. 2a through 2d are actual Scanning Electron Microscope photographs of a gyroscope built according to the teachings of the invention. FIGS. 2b, 2c and 2d show close-ups of varying scale—the approximate areas covered by the closeups are delineated with dashed lines on the overall view of FIG. 2a.

These photographs demonstrate the open cellular structure preferably used in the gyroscope. The silicon beams are 1–2 $\mu$m wide and 10–50 $\mu$m deep. Since the release etch is timed, wider beam structures are not fully undercut and remain fixed to the substrate, and are used as support structures and interconnect surfaces. Released beams are connected together to form the mechanical segments of the gyroscope. Flex leads designed to route electrical connections to the gyroscope are made integral with the same fabrication sequence.

Electrical Routing on the Gyroscope

Some distinguishing features of this gyroscope design are the electrical routing and connection of the electrostatic drives and sense capacitors. What makes this routing possible is the method of isolating regions of the movable silicon. As described in the fabrication section below, the gyroscope is essentially carved out of one piece of conductive silicon. Since all of the electrostatic drives and sense capacitors are constructed from this silicon, unless additional steps are taken to isolate regions of the silicon, all of the electrodes will be shorted together. The isolation segments described below address this need to isolate regions of the silicon. These segments provide a functionality that is not present in other silicon gyroscope designs, namely, the ability to form multiple electrodes on one body of movable silicon.

In other silicon gyroscopes the movable structure is all at one potential. This means that the mating electrode of the RDM capacitive transducers, either sensors or actuators, must be mounted to the case. The ability to isolate regions of the movable silicon means that both electrodes of a RDM transducer can be mounted to the movable structure, half on the RDM and half on the TSM. Since the TSM supports the RDM, the operation of the drive actuator is therefore decoupled from the motion of the TSM about the output axis.

Other researchers have created mechanically decoupled gyroscope designs with a TSM and a RDM. These previous designs all drive the RDM with one actuator electrode mounted to the case (1) or (5). This can potentially cause unwanted coupling between the output motion of the TSM and the input motion of the RDM. The preferred solution within the invention is the previously mentioned mounting of the RDM actuator electrodes, one on the TSM and one on the RDM. One alternative is to design the RDM drive actuator such that the output motion of the TSM does not affect the RDM actuator's force that it can apply to the RDM even though one electrode is mounted to the case (1) or (5). This improvement can be made by using the RDM sense capacitor (14) as an actuator. The concentric arc design of (14) is unaffected by rotations about the output axis typically experienced during operation.

Figure 13A:
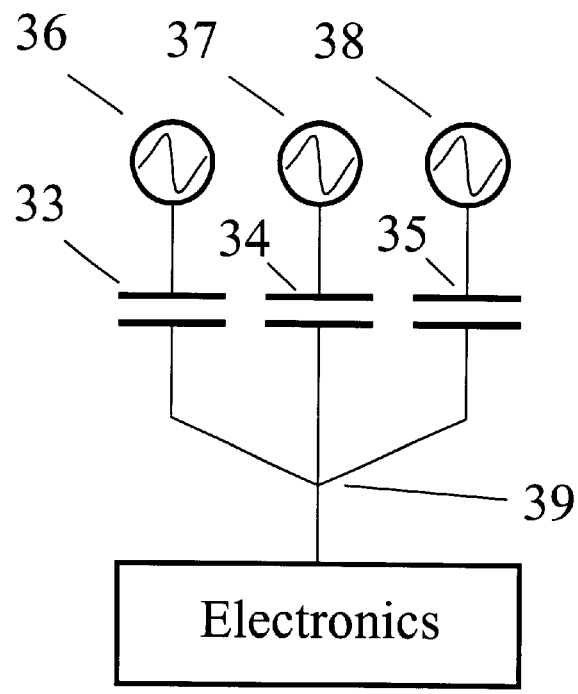
FIG. 13a shows an electrical schematic of typical gyroscope designs of the prior art.
Figure 13B:
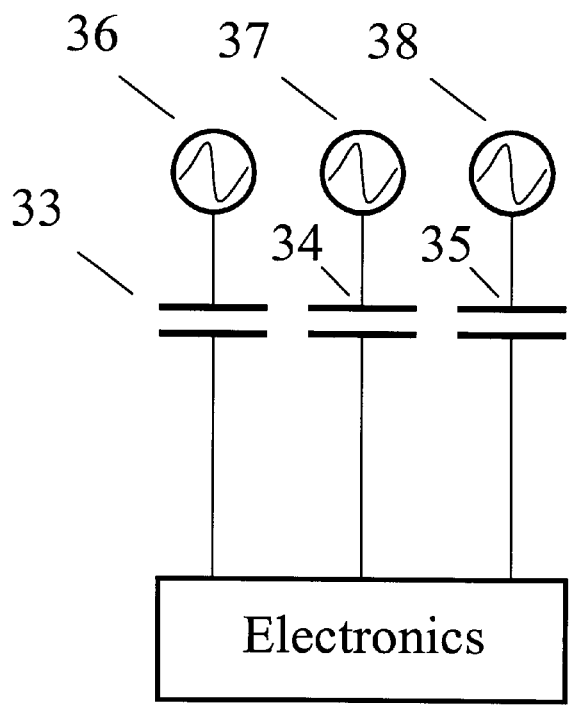
FIG. 13b shows an electrical schematic for the gyroscope of the invention.

Within the present invention, the ability to electrically isolate multiple regions within a movable structure has significant implications in the circuit design necessary to process the gyroscope signals. In prior art where the entire movable structure is at one potential, difficulty is encountered processing combined electrical signals. FIG. 13a illustrates the difficulty with previous designs. Three capacitive transducers are shown as part of an electronics schematic, the TSM sense capacitor (33), RDM sense (34), and RDM drive (35). These three capacitive transducers are either measured or driven by the corresponding voltage signals (36), (37), and (38). In prior art, the RDM and TSM form one electrode common to transducers (33), (34), and (35). This common electrode formed by the RDM and TSM is shown in the schematic as a junction (39). Therefore, the electronics must split the signals apart during signal processing. This can be accomplished by keeping the frequencies of the voltage signals (36), (37), and (39) sufficiently separate; however, it is not preferred. The present invention permits us to keep the signals separate as shown in FIG. 13b. Since separate wires run from the transducer (33), (34), and (35) to the gyroscope electronics, voltage signals (36), (37), and (38) can be at similar or even equal frequencies and not cause difficulties separating the respective signals.

Figure 14:
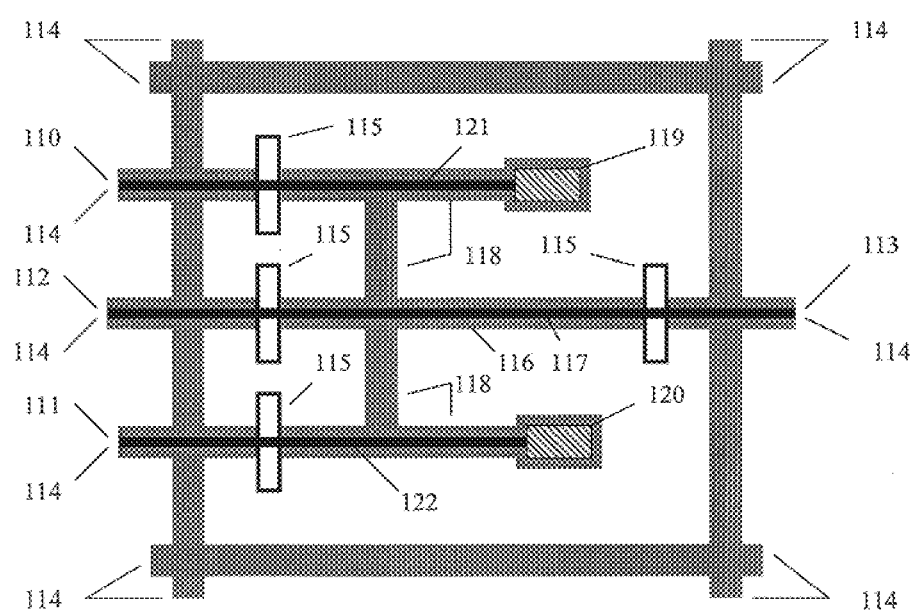
FIG. 14 shows a diagram of a movable crossover.

Electrical crossovers facilitate the connection to isolated regions of silicon. Electrical crossovers are used both in the fixed silicon regions as well as mounted to movable portions RDM and TSM. Crossovers in the fixed silicon regions provide flexibility in the way that wires can be routed from the bonding pads to the drive and sense electrodes. Crossovers in the movable silicon region provide flexibility in the routing of electrodes within the RDM and TSM. In some cases, without the crossovers it would be topologically impossible to make the required connections. Fixed electrical crossovers are covered in U.S. application Ser. No. 09/231,082, assigned to an assignee of the present invention. Crossovers in the movable structure are an object of the present invention. FIG. 14 shows an example of a movable crossover.

Different Configurations

Figure 6A:
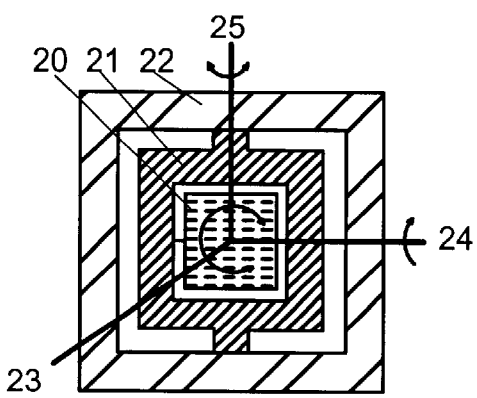
FIG. 6 shows a simplified diagram of three configurations for the gyroscope of the invention.
Figure 6B:
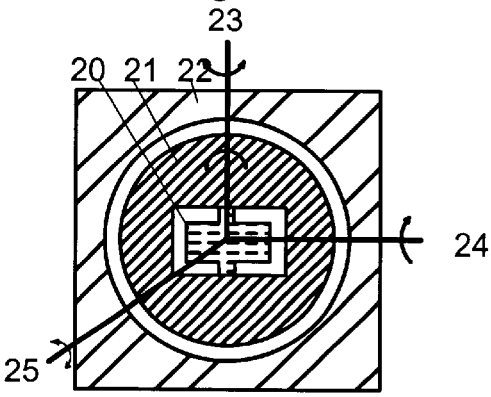
Figure 6C:
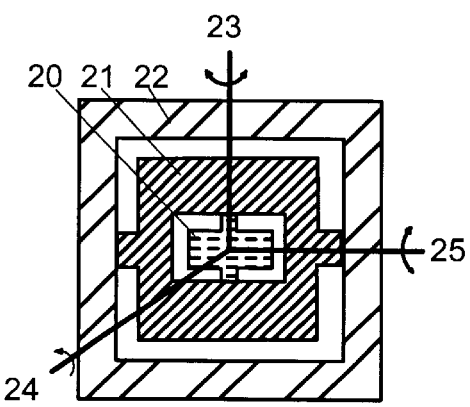

There are three primary configurations for the gyroscope as shown in FIGS. 6a through 6c. Each of these simplified diagrams shows the RDM (20), TSM (21) and case (22), and the spin axis (23), input axis (24) and output axis (25). These three FIGS. 6a, 6b, and 6c are abstractions of gyroscope design. They show how the actual shape of the gyroscope and the arrangement of the pieces can vary widely yet still produce a gyroscope. The similarity between the configurations is that they all have a case, RDM, and TSM; they all have orthogonal spin, input, and output axes; and, they all have the RDM attached to the TSM and the TSM attached to the case. One additional similarity is that all three configurations contain symmetry about the three axes. This symmetry is necessary to dynamically balance the gyroscope. The differences are the directions that the spin, input, and output axes point. As one would suspect, with three mutually orthogonal axes, there are three possible combinations when two of the axes are in the plane of the gyroscope. The configurations can then be defined by which axis points out of the plane. In 6a the spin axis points out of the plane. In 6b the output axis points out of the plane. And in 6c, the input axis points out of the plane.

Figure 7:
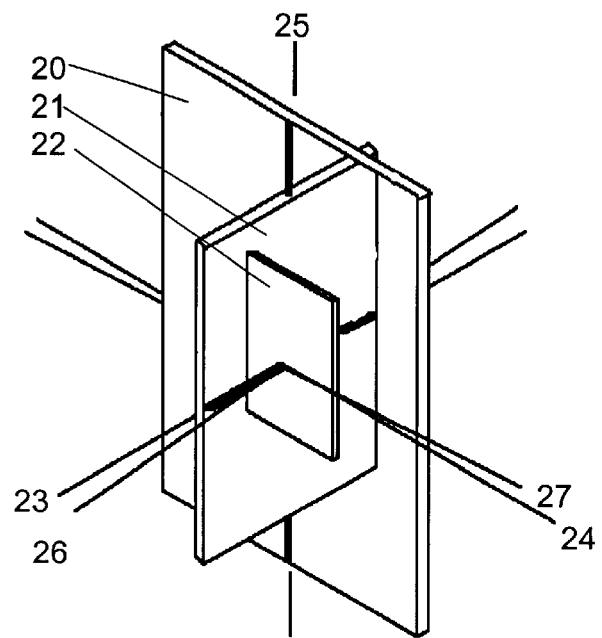
FIG. 7 shows a diagram of the coordinate axes of the gyroscope of the invention.

FIG. 7 defines the two co-ordinate axes at play. The three axes (26),(27) and (25) (denoted spin reference, input reference, and output reference) refer to the gyro case relative to inertial space and the three axes (23), (24) and (25) (denoted spin, input, and output axes) to the TSM co-ordinate frame. Axes (23), (24) and (25) are attached to the TSM. Axes (23), (24), and (25) differ from (26), (27), and (25) by a single angle of rotation equal to the angle of rotation of the TSM about the output axis.

The shape of the RDM, TSM, and case do not define the gyroscope configuration. Instead the spin, input, and output axes define the configuration. For example, the gyroscope in FIG. 6b has a rectangular RDM inside the TSM; however, it has the same configuration as the invention described in FIGS. 1 through 5. In both cases, the output axis points out of the plane. In both cases the RDM is attached to the TSM and the TSM is attached to the case. The fact that in one case the RDM is rectangular and in the other the RDM is an annulus is irrelevant from a configuration standpoint. The point that the RDM is inside the TSM in one case and outside in the other is irrelevant from a configuration standpoint. Both cases operate as gyroscopes the same way and are therefore referred to as being the same configuration. One may work better by producing a larger output signal, but functionally they are the same.

The present invention can be constructed to form a gyroscope in any one of the three configurations shown in FIGS. 6a, 6b, and 6c. The preferred embodiment is a variation on the configuration of FIG. 6b, as described and shown in FIGS. 1 through 5, with the RDM placed on the outside of the TSM.

Each of these configurations has specific advantages over the other two. One example is the orientation of the input axis. If one needs to construct a monolithic system of gyroscopes that measures all three axes of rotation, at least two configurations are needed and one of them must be the one shown in FIG. 6c.

Symmetry is an important property in the realization of a gyroscope in all three configurations. Symmetry in many cases eliminates sensitivities to cross-axis rotation rates. One example is that the configuration of FIG. 6b requires symmetry in the plane relative to the center. The symmetry makes the inertia of the TSM (21) about the spin (23) and input (24) axes equal, making their difference zero thereby eliminating gyro sensitivity to cross-axis rotation rates.

Electronics Design

Figure 8:
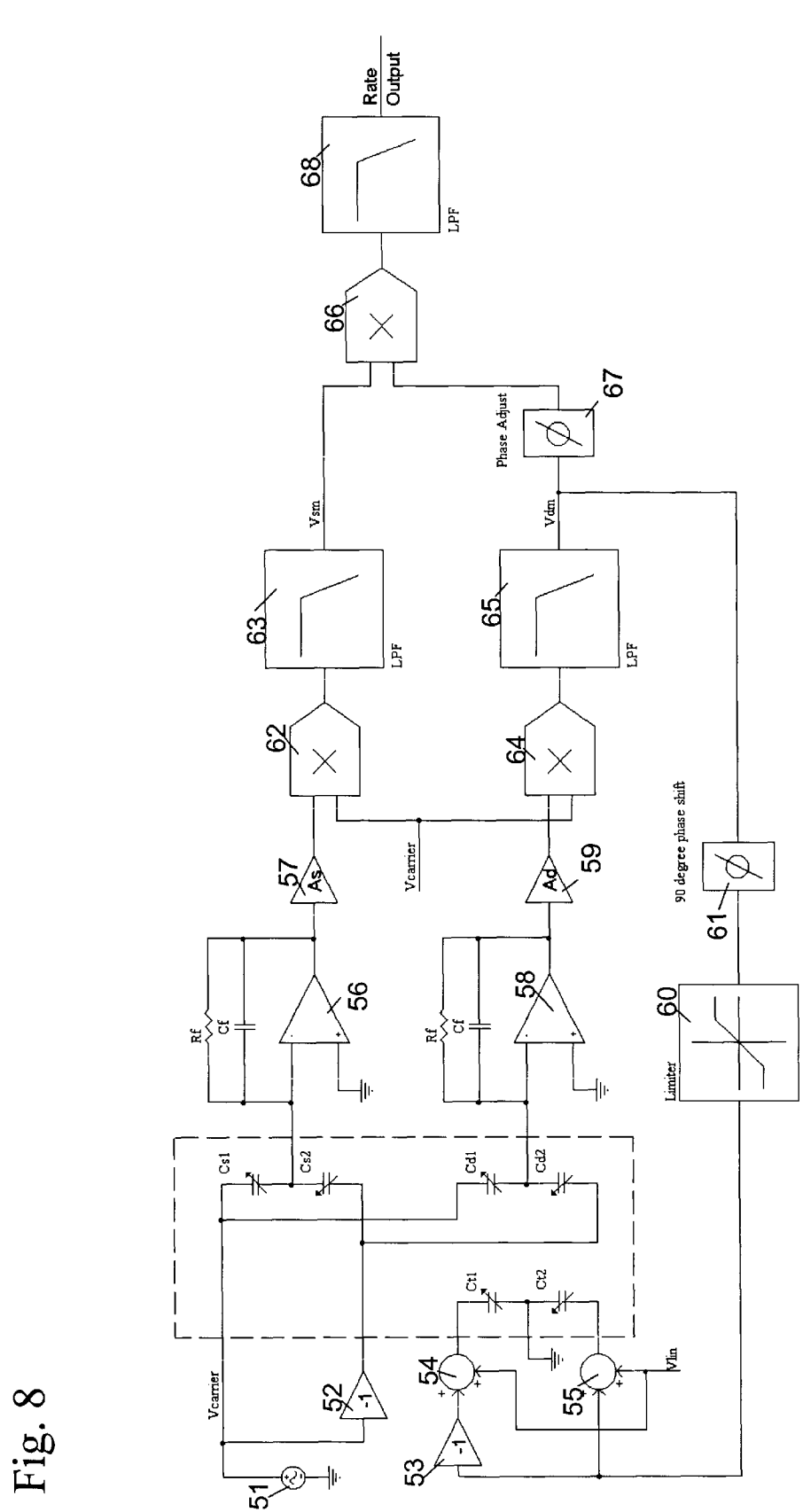
FIG. 8 shows a schematic of an embodiment of the electronics for the gyroscope of the invention.
Figure 9A:
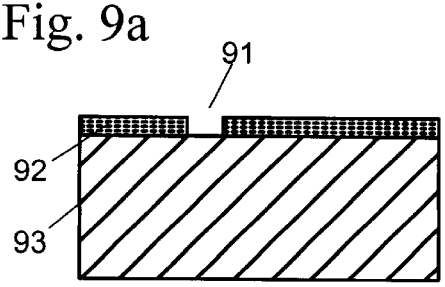
FIGS. 9a–9h show the fabrication process for a silicon gyroscope according to an embodiment of the invention.
Figure 9B:
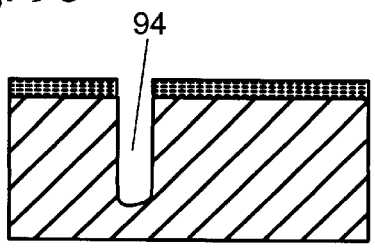
Figure 9C:
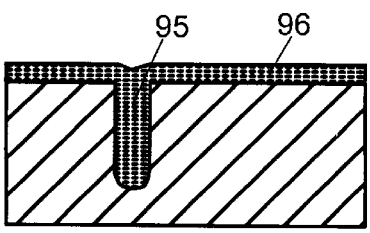
Figure 9D:
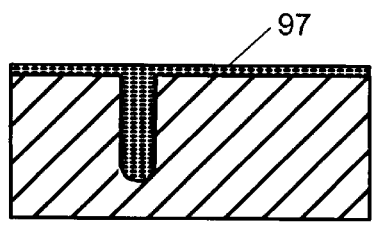
Figure 9E:
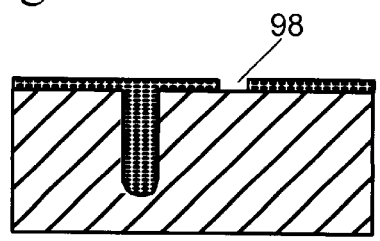
Figure 9F:
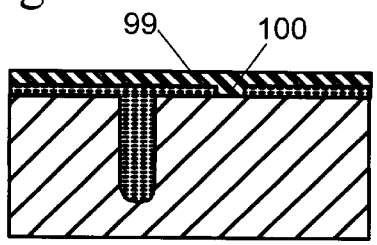
Figure 9G:
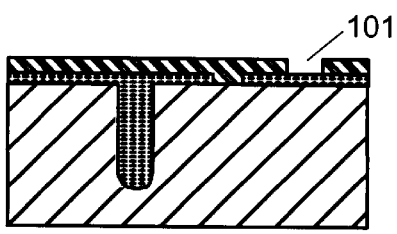
Figure 9H:
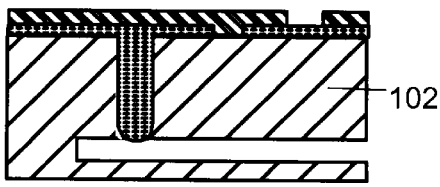

FIG. 8 shows a schematic for electronics which may be used to drive the gyroscope of the invention. The electronics operate the gyroscope in an open-loop mode in that the TSM rotation is not driven to null. For the RDM, however, there is a feedback control loop that forces the member to oscillate at its resonant frequency.

The electronics for the gyroscope can be divided into two paths, one for the RDM and one for the TSM. In FIG. 8, the TSM path is shown on the upper half of the schematic.

The mechanical sense element for the gyroscope is contained schematically in the dashed-line box in FIG. 8. In the upper half of the box, capacitors $C_{s1}$ and $C_{s2}$ represent the two halves of the differential capacitor used to determine the rotation of the TSM. $C_{s1}$ corresponds to the parallel connection of all of the TSM sense capacitors (7) in FIG. 1 above line (28). $C_{s2}$ corresponds to the parallel connection of all of the TSM sense capacitors below line (28). In the lower box, capacitors $C_{d1}$ and $C_{d2}$ are used to sense the RDM's motion. $C_{d1}$ corresponds to the parallel connection of all of the RDM sense capacitors (14) in FIG. 1 to the left of a hypothetical line joining the two RDM torsional flexures (15). $C_{d2}$ corresponds to the parallel connection of all of the RDM sense capacitors to the right of the hypothetical line. $C_{t1}$ and $C_{t2}$ are used as actuators to torque the RDM. $C_{t1}$ and $C_{t2}$ corresponds to the parallel connection of all of the RDM drive actuators (10) in FIG. 1 to the left and right of the hypothetical line, respectively.

The electronics for sensing the motion of the RDM and TSM are based on a carrier system. Shown at (51) in the upper left hand corner of the schematic is the origin of the 100 kHz, 2.5 Volt peak-peak carrier ($V_{carrier}$). The carrier is inverted in inverter (52). By placing these equal but opposite high-frequency carrier voltages across the series connection of $C_{s1}$ and $C_{s2}$, any inequality of $C_{s1}$ and $C_{s2}$ will result in a net current flow into or out of the midpoint connection when it is held at a ground potential. This current flow is integrated by Op Amp (56) and Cf to give a signal at the output of the amp (56) that is a sine wave at the carrier frequency, with an amplitude proportional to the difference between $C_{s1}$ and $C_{s2}$. Resistor Rf serves to define DC voltage potentials. Next, this differential carrier signal is amplified (57) by a gain of $A_s$. The schematic symbol (57) is a collection of amplifier stages that collectively amplify the signal by a gain of $A_s$. In order to obtain a voltage signal that is proportional to the motion of the TSM, the amplitude modulated carrier signal needs to be demodulated. This process is carried out by multiplying (62) the signal coming out of amplification stage (57) by the carrier ($V_{carrier}$) and then passing the resultant through a low pass filter (63) in order to extract a low-frequency signal, $V_{sm}$, that is proportional to the rotation of the TSM. Typical low pass filter (LPF) cut-off frequencies are set at approximately 10 kHz.

Using a nearly identical set of electronics—Op Amp (58) outputs a signal having an amplitude proportional to the difference between $C_{d1}$ and $C_{d2}$, which is amplified by a factor of $A_d$ in amplifier (59), multiplied (64) by $V_{carrier}$ and filtered (65)—the voltage signal Vdm is produced that is proportional to the motion of the RDM. This RDM signal is used as a demodulation reference and a feedback signal to keep the RDM at resonance.

Resonance of the RDM is maintained by the feedback loop on the lower portion of the schematic. To start with, $V_{dm}$, a measure of the RDM's motion, is passed through a 90 degree phase-shifter (61) and through a voltage limiter (60). The voltage limiter provides the nonlinearity that bounds the oscillations of the RDM in a controlled fashion. This limited signal is ultimately fed back to the driving capacitors $C_{t1}$ and $C_{t2}$. Since it is desired to differentially torque the RDM by pulling up on one side of the RDM and pulling down on the other, the limited signal is passed through an inverter (53) for one half of the RDM drive, $C_{t1}$ and not passed through an inverter for the other drive, $C_{t2}$. Just prior to feeding the drive signal into the drive capacitors, summing junctions (54) and (55) are used to shift the oscillatory signal by a DC voltage level, Vlin. Vlin is used to keep all of the voltage levels positive for proper operation of electrostatic drives. Since the torque produces by an electrostatic actuator is proportional to the square of the voltage, without the shift in DC voltage level, the two opposite phased oscillitory drive signals would produce equal and opposite torques and cancel one another's effect. The DC voltage level shift ensures that the torques work together to drive the RDM.

Vlin can also be used to adjust the resonant frequency of the RDM. This DC bias, applied to the RDM drive electrodes, yields a force that depends on the deflection. This force gradient can be modeled as an electrostatic stiffness. The net torsional stiffness of the RDM is the sum of the mechanical plus the electrostatic stiffness. Since the resonant frequency is proportional to the square root of the net stiffness, by adjusting the value of the DC bias, the RDM resonance can be tuned to be at a specific separation from the TSM's resonance.

To convert the TSM signal, $V_{sm}$, into the gyroscope rate output signal, one more level of demodulation is necessary. Note that $V_{sm}$ contains the rate input information as well as a quadrature signal that is due to misalignments and imperfections in the gyroscope. Fortunately, the quadrature signal is phase shifted from the rate signal by approximately 90 degrees. The electronics take this into account and appropriately shift the phase (67) of the reference signal, $V_{dm}$, prior to performing the multiplication (66). After passing the resultant signal through a low-pass filter (68) with a cutoff frequency set at approximately 50 Hz, we arrive at the gyroscope output voltage (rate output) that is proportional to the angular rate input.

At the mechanical resonant frequency of the RDM, the phase shift between driving a signal into $C_{t1}$ and $C_{t2}$ and sensing the difference between $C_{d1}$ and $C_{d2}$ will be 90 degrees. This phase shift, combined with the shift from the 90 degree phase shift block and a 180 degree phase inversion already present in the loop will give a 360 degree phase shift in the complete loop at the resonant frequency. If the gain, $A_d$, is chosen correctly, the loop and the driving member will oscillate at, or near, the mechanical resonant frequency. The limiter circuit will bound the amplitude of the oscillation. The oscillation will start due to the presence of thermal noise in the system. The electronics force the RDM to oscillate at its resonant frequency, nominally 850 Hz. The quality factor, Q, of the drive is 5 at an operating pressure of 5 Torr. The resonant frequency of the TSM is nominally 950 Hz with a Q of 50. Separation of the resonances is designed to reduce the scale factor's sensitivity to temperature-induced variations in the resonance. This separation is also necessary to provide sufficient mechanical sensor bandwidth. Other operating pressures, resonances, and Q's may be used depending on the specific application.

The bandwidth of the gyro depends on the magnitude of separation between the rotor and sense member oscillation resonances. With only this parameter in mind one would choose a large separation between the RDM and TSM resonance. This separation is traded-off in design with the sensitivity of the gyro. The sensitivity of the gyro increases as the resonances approach each other. Maximum sensitivity occurs when the resonances are equal. The preferred approach is to operate the gyro with the sense member off-resonance, that is, with the sense member resonance separated from the rotor member. This scenario is less subject to phase changes as the resonances drift relative to each other.

Damping is an important parameter in the design of a gyroscope. In general there is significant design freedom for damping in the fabrication process used to create the gyroscopes. In the current design of the RDM, the open cellular structure provides much lower damping than would be found with a solid plate. Arrangement of the cell sizes can be tailored to reduce or increase the RDM's damping. For the TSM, the arrangement and geometry of the capacitor sense plates can also be changed to reduce or increase the TSM's damping.

Although the TSM is operated in open-loop, using the same geometry but with a different set of electronics, it is possible to operate the gyroscope in a closed loop where the TSM motion is driven to null. In some cases, an additional set of actuators would be useful to accomplish this extra drive function. Also, within the gyroscope circuitry it may be advantageous to provide a drive signal to the TSM in order to null any quadrature signals coupling from the RDM's motion into the TSM output with zero rate input. Driving the quadrature signal to null reduces the gyroscopes temperature sensitivity.

The circuit described in FIG. 8 was constructed using discrete circuits. It is possible to convert this circuit into an integrated circuit that uses switched capacitor techniques. Given that the gyroscope of the invention can be sealed at the wafer level, it is also possible to take the gyroscope sense element and an integrated circuit that carries out the functionality of the circuit described in FIG. 8 and package them together in an industry standard SOIC package.

Method of Fabrication

The preferred fabrication sequence for the silicon gyroscope relies on a silicon micromechanical fabrication process described in U.S. patent application Ser. No. 09/231,082, assigned to an assignee of the present invention, and incorporated herein by reference. The process results in a silicon gyroscope composed of a grid of cantilevered silicon beams with integral electrical isolation segments, which serve to mechanically connect but electrically isolate separate parts of the gyroscope.

The fabrication process is detailed in the application Ser. No. 09/231,082 and depicted in FIGS. 9a through 9h.

Step 1 (FIG. 9a): the fabrication process begins with a silicon wafer (93) with a dielectric layer (92) patterned with conventional techniques (91).

Step 2 (FIG. 9b): the wafer (93) is etched to produce an isolation trench (94)

Step 3 (FIG. 9c): the trench is filled (95) with dielectric layer (96).

Step 4 (FIG. 9d): the dielectric layer (96) and filled trench (95) are planarized to provide a smooth dielectric surface (97) with an integral electrically isolating dielectric segment.

Step 5 (FIG. 9e): a via (98) in the dielectric (97) is patterned and etched to expose the surface of the silicon (93) for electrical connection.

Step 6 (FIG. 9f): a metal layer (99) is deposited on the dielectric layer (97) and makes contact through the via (98) at the silicon surface (100).

Step 7 (FIG. 9g): the metal (99), preferably aluminum, is patterned (101) to create different electrode routing configurations.

Step 8 (FIG. 9h): silicon beams (102) are patterned, etched, passivated, and released to provide free standing cantilevers for micromechanical elements.

The process offers several distinct advantages that permit the gyroscope to function and operate at high performance levels. The high aspect, single crystal silicon cantilever beams allow the gyroscope to be built over mm-scale diameters, large by conventional micromachining standards. This permits the gyroscope to obtain large inertial mass, resulting in high sensitivity and high resolution. A metal conductive layer is present on the top of the beam structures only, providing multiple structure connections such as are required for RDM drive and sense and TSM sense. Isolation segments are incorporated into the silicon beams, reducing parasitic capacitance and electrically decoupling the different functions of the gyroscope. In regions where capacitive actuation or sensing is required, the metal layer contacts to the beam silicon cores, which serve as the capacitor plates. This is allowed because the isolation segments interrupt the conduction path from the silicon beams to the substrate silicon. Finally, in areas which require electrical paths to cross each other in order to address different active sections of the gyroscope, a multi-level conduction path is possible using the top conductive metal layers and the contacts to the underlying silicon. The process thus allows each of the functionalities required in the gyroscope and performs them in a highly manufacturable environment with standard silicon substrates.

An important byproduct of the fabrication process is the ability to create electrical interconnect structures which perform the standard crossover function of a multi-level metalization. The crossover is described in application Ser. No. 09/231,082 and shown in FIG. 10 as it is practiced within the gyroscope design.

Figure 10:
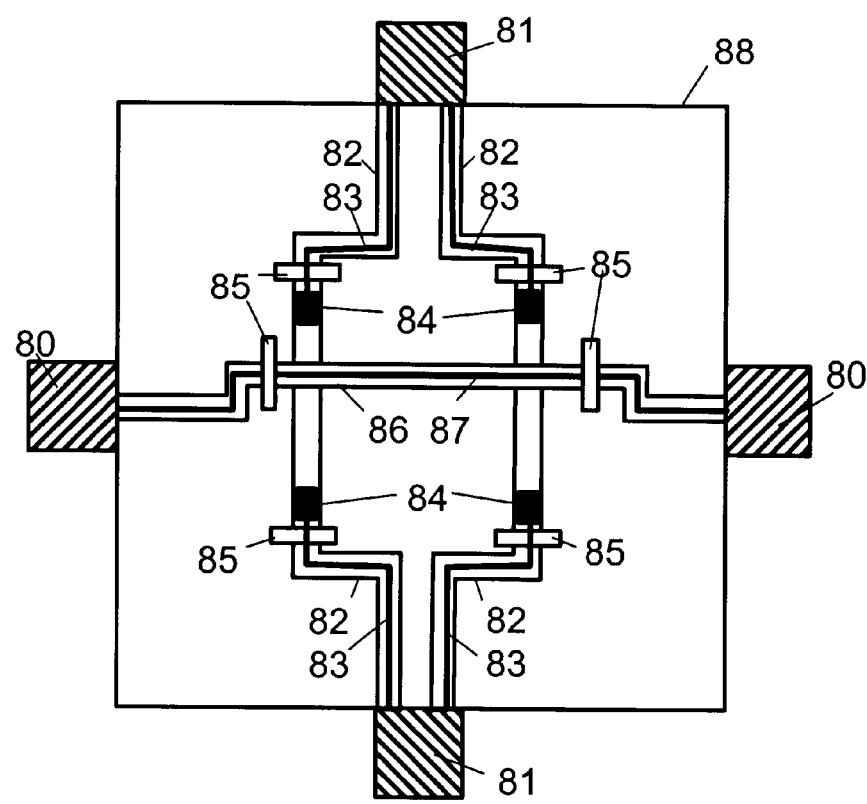
FIG. 10 shows the structures of the invention which perform the crossover function of a multi-level metalization.

In FIG. 10, box (88) represents a cavity which contains simple released silicon beams (82) and (86). Signal A (80) is routed across one beam structure (86) using only the planar metal layer (87) on top of the beam (86). Signal B (81) is routed perpendicular to signal A (80) using a path through the silicon beams (82) themselves. The current path for B travels within the metal (83) on top of the beams (82), connects to the silicon through the contact vias (84), and flows through the double silicon beams (82) to the opposing via (84) and out the metal path (83). In this way, the B current travels beneath and is isolated from A, creating a multiple level current path without the need for the traditional two metal layers. In order that the silicon conduction path for B be isolated from the rest of the silicon substrate, electrical isolation segments (85) are strategically placed within the design. The result is a multiple level interconnect scheme using only one planar metal layer and the conduction of the silicon beam cores.

The present invention extends the crossover functionality by placing the crossover structure inside the movable structure, either the TSM or the RDM. FIG. 14 shows a diagram of the crossover. This design connects to the rest of the movable structure at points (114). The purpose of the crossover is to route signal A vertically from point (110) to point (111) across signal B that runs horizontally from point (112) to point (113). The electrical path for signal A starts at point (110) on a metal trace (121). The metal trace (121) runs on top of a beam and connects to via ( 119) where signal A enters the silicon beam. All silicon electrical paths starting at via (119) are isolated from the surrounding silicon connections (114) by isolation joints (115). Signal A at via (119) travels along beam (118) to via (120). At via (120) signal A enters metal trace (122) and travels to point (111) where it continues to other regions within the movable structure. Signal B starts at point (112) on metal trace (117) and travels straight from point (112) to point (113) where it continues to other regions within the movable structure.

It is also noted that the formation of isolation segments and crossovers is not limited to single-crystal silicon, but also applies to thick-film polysilicon, epitaxial silicon, and silicon-on-insulator geometries.

What is claimed is:

1. A silicon angular rate gyroscope comprising:
  a substrate,
  a movable body comprised of a planar arrangement of high-aspect ratio single-crystal silicon beams forming an open cellular structure, the body comprising:
    a torque summing member (TSM) mounted to the substrate by flexures that substantially restrict motion of the TSM to torsional oscillations about an output axis, and
    a rotor driven member (RDM) mounted to the TSM by flexures that substantially restrict motion of the RDM to torsional oscillations about a spin axis,
  the movable body having a plurality of regions of silicon which are mechanically connected but electrically isolated, forming transducers for sensing the motion of the TSM and driving the motion of the RDM.

2. The gyroscope of claim 1, further comprising an actuator having two sections, a first section mounted on the TSM and a second section mounted on the RDM, at least one of the first section and the second section being an electrically isolated silicon region, such that the RDM may be driven into motion by application of voltage between the first section of the actuator and the second section of the actuator.

3. The gyroscope of claim 1, further comprising a capacitive sensor having two sections, a first section mounted on the RDM and a second section mounted on the TSM, at least one of the first section and the second section being an electrically isolated silicon region, such that the RDM motion can be sensed by changes in capacitance of the capacitive sensor.

4. The gyroscope of claim 1, further comprising a capacitive TSM sensor having two sections, a first section mounted on the TSM and a second section mounted on the substrate, at least one of the first section and the second section being an electrically isolated silicon region, such that the TSM motion can be sensed by changes in capacitance of the capacitive transducer.

5. The gyroscope of claim 4, further comprising an electronic circuit for demodulating a TSM oscillation sensed by the TSM sensor into a signal that is proportional to a rate of rotation of the substrate.

6. The gyroscope of claim 1, further comprising a capacitive RDM sensor having two sections, a first section mounted on the RDM and a second section mounted on the substrate, at least one of the first section and the second section being an electrically isolated silicon region, such that the RDM motion can be sensed by changes in capacitance of the sensor, and the capacitance of the sensor is insensitive to small motions of the TSM.

7. The gyroscope of claim 1, in which the substrate has a recess, and the RDM and TSM are symmetrical structures arranged concentrically in the recess.

8. The gyroscope of claim 7 wherein the TSM is interior to the RDM.

9. The gyroscope of claim 7 wherein the RDM is interior to the TSM.

10. The gyroscope of claim 7, further comprising a plurality of flexible electrical leads, mechanically attaching the body to the substrate, such that electrical signals can be routed into and out of the gyroscope.

11. The gyroscope of claim 1, in which the substrate has a ring-shaped recess with a central projection, and the RSM and TDM are in the form of rings, arranged concentrically in the recess around the central projection.

12. The gyroscope of claim 1, further comprising a plurality of inner flexures connecting the body to the central projection.

13. The gyroscope of claim 1, further comprising a plurality of structures mounted on the RDM to balance inertias of the RDM about the spin and input axes.

14. The gyroscope of claim 1 wherein the substrate forms a plane, and the output axis points out of the plane.

15. The gyroscope of claim 1 wherein the substrate forms a plane, and the input axis points out of the plane.

16. The gyroscope of claim 1 wherein the substrate forms a plane, and the spin axis points out of the plane.

17. The gyroscope of claim 1, wherein the flexures mounting the TSM comprise thick and thin sections, and a relative size of the thick and thin sections are selected to determine an axial stress state and a stiffness of the flexures.

18. The gyroscope of claim 1, in which the electrically isolated regions of silicon are separated by joints formed from a dielectric material that mechanically connect but electrically isolate the said isolate regions of silicon.

19. The gyroscope of claim 1, further comprising:
a) at least one TSM sensor comprising at least one electrically isolated region, for sensing motion of the TSM;
b) at least one RDM sensor comprising at least one electrically isolated region, for sensing motion of the RDM;
c) at least one RDM actuator comprising at least one electrically isolated region, for applying electrostatic force to the RDM; and
d) a signal processing circuit comprising:
  i) an oscillator having a carrier signal output, coupled to at least one TSM sensor and to at least one RDM sensor;
  ii) a TSM sense circuit having an input coupled to the TSM sensor driven by the oscillator, and an output, the TSM circuit processing a signal from the input and producing a signal at the output which is proportional to a motion of the TSM;
  iii) an RDM sense circuit having an input coupled to the RDM sensor driven by the oscillator, and an output, the RDM circuit processing a signal from the input and producing a signal at the output which is proportional to a motion of the RDM;
  iv) a rate determining circuit having a first input coupled to the output of the TSM sense circuit and a second input coupled to the output of the RDM sense circuit, and an output, the rate determining circuit combining a signal from the first input and a signal from the second input and providing an output signal at the output which is representative of a rate of movement of the gyroscope; and
  v) an RDM drive circuit having an input coupled to the output of the RDM sense circuit and an output coupled to at least one RDM actuator, the RDM drive circuit maintaining a resonance of the RDM by producing a signal at the output which is modified by feedback from a signal at the input.

20. The gyroscope of claim 19, in which the rate determining circuit comprises:
a) a phase adjuster having an input coupled to the output of the RDM sense circuit and an output providing a signal which is approximately 90 degrees phase shifted from a signal present at the input;
b) a multiplier having a first input coupled to the output of the TSM sense circuit, a second input coupled to the output of the phase adjuster, and an output providing a signal which is the product of the signals on the first input and the second input; and
c) a low-pass filter having an input coupled to the output of the multiplier and an output having a low frequency signal,
the output of the low-pass filter being the output of the rate determining circuit.

21. The gyroscope of claim 19, in which the RDM drive circuit comprises:
a) a 90 degree phase shifter having an input coupled to the output of the RDM sense circuit and an output;
b) a voltage limiter having an input coupled to the output of the 90 degree phase shifter, and an output;
the output of the voltage limiter being coupled to the RDM electrostatic levitation actuators through a summing junction with a DC potential.

22. The gyroscope of claim 19, in which the RDM drive circuit further comprises a bias input, such that a DC bias voltage at the bias input applies a DC bias voltage to the RDM actuator, adjusting a resonant frequency of the RDM.

23. The gyroscope of claim 19, in which the signal processing circuit is in the form of an integrated circuit.

24. The gyroscope of claim 23, in which the a first substrate containing the movable body is covered by a second substrate with a seal and a standoff between the first and second substrate provided by a glass frit.

25. the gyroscope of claim 24, in which the integrated circuit and the first and second substrates are packaged together in one hybrid package.

26. The gyroscope of claim 1, in which the a first substrate containing the movable body is covered by a second substrate with a seal and a standoff between the first and second substrate provided by a glass frit.

27. A silicon angular rate gyroscope comprising:
a substrate,
a movable body comprising:
   a torque summing member (TSM) mounted to the substrate by flexures that substantially restrict motion of the TSM to torsional oscillations about an output axis, and
   a rotor driven member (RDM) mounted to the TSM by flexures that substantially restrict motion of the RDM to torsional oscillations about a spin axis,
the movable body having a plurality of electrically isolated regions of silicon which are mechanically connected but electrically isolated by one or more transverse isolation segments formed from a dielectric material, forming transducers for sensing the motion of the TSM and driving the motion of the RDM.

28. The gyroscope of claim 27, further comprising an actuator having two sections, a first section mounted on the TSM and a second section mounted on the RDM, at least one of the first section and the second section being an electrically isolated silicon region which is mechanically connected but electrically isolated by transverse segments formed from a dielectric material, such that the RDM may be driven into motion by application of voltage between the first section of the actuator and the second section of the actuator.

29. The gyroscope of claim 27, further comprising a capacitive sensor having two sections, a first section mounted on the RDM and a second section mounted on the TSM, at least one of the first section and the second section being an electrically isolated silicon region which is mechanically connected but electrically isolated by transverse segments formed from a dielectric material, such that the RDM motion can be sensed by changes in capacitance of the capacitive sensor.

30. The gyroscope of claim 27, further comprising a capacitive TSM sensor having two sections, a first section mounted on the TSM and a second section mounted on the substrate, at least one of the first section and the second section being an electrically isolated silicon region which is mechanically connected but electrically isolated by transverse segments formed from a dielectric material, such that the TSM motion can be sensed by changes in capacitance of the capacitive transducer.

31. The gyroscope of claim 30, further comprising an electronic circuit for demodulating a TSM oscillation sensed by the TSM sensor into a signal that is proportional to a rate of rotation of the substrate.

32. The gyroscope of claim 27, further comprising a capacitive RDM sensor having two sections, a first section mounted on the RDM and a second section mounted on the substrate, at least one of the first section and the second section being an electrically isolated silicon region which is mechanically connected but electrically isolated by transverse segments formed from a dielectric material, such that the RDM motion can be sensed by changes in capacitance of the sensor, and the capacitance of the sensor is insensitive to small motions of the TSM.

33. The gyroscope of claim 27, in which the substrate has a recess, and the RDM and TSM are symmetrical structures arranged concentrically in the recess.

34. The gyroscope of claim 33 wherein the TSM is interior to the RDM.

35. The gyroscope of claim 33 wherein the RDM is interior to the TSM.

36. The gyroscope of claim 33, further comprising a plurality of flexible electrical leads, mechanically attaching the body to the substrate, such that electrical signals can be routed into and out of the gyroscope.

37. The gyroscope of claim 27, in which the substrate has a ring-shaped recess with a central projection, and the RSM and TDM are in the form of rings, arranged concentrically in the recess around the central projection.

38. The gyroscope of claim 27, further comprising a plurality of inner flexures connecting the body to the central projection.

39. The gyroscope of claim 27, further comprising a plurality of structures mounted on the RDM to balance inertias of the RDM about the spin and input axes.

40. The gyroscope of claim 27 wherein the substrate forms a plane, and the output axis points out of the plane.

41. The gyroscope of claim 27 wherein the substrate forms a plane, and the input axis points out of the plane.

42. The gyroscope of claim 27 wherein the substrate forms a plane, and the spin axis points out of the plane.

43. The gyroscope of claim 27, wherein the flexures mounting the TSM comprise thick and thin sections, and a relative size of the thick and thin sections are selected to determine an axial stress state and a stiffness of the flexures.

44. The gyroscope of claim 27, in which the the RDM is formed from an open cellular structure composed of arrangements of high aspect ratio silicon beams.

45. The gyroscope of claim 27, in which the the TSM is formed from an open cellular structure composed of arrangements of high aspect ratio silicon beams.

46. The gyroscope of claim 27, further comprising:
a) at least one TSM sensor comprising at least one electrically isolated region, for sensing motion of the TSM;
b) at least one RDM sensor comprising at least one electrically isolated region, for sensing motion of the RDM;
c) at least one RDM actuator comprising at least one electrically isolated region, for applying electrostatic force to the RDM; and
d) a signal processing circuit comprising:
   i) an oscillator having a carrier signal output, coupled to at least one TSM sensor and to at least one RDM sensor;
   ii) a TSM sense circuit having an input coupled to the TSM sensor driven by the oscillator, and an output, the TSM circuit processing a signal from the input and producing a signal at the output which is proportional to a motion of the TSM;
   iii) an RDM sense circuit having an input coupled to the RDM sensor driven by the oscillator, and an output, the RDM circuit processing a signal from the input and producing a signal at the output which is proportional to a motion of the RDM;
   iv) a rate determining circuit having a first input coupled to the output of the TSM sense circuit and a second input coupled to the output of the RDM sense circuit, and an output, the rate determining circuit combining a signal from the first input and a signal from the second input and providing an output signal at the output which is representative of a rate of movement of the gyroscope; and v) an RDM drive circuit having an input coupled to the output of the RDM sense circuit and an output coupled to at least one RDM actuator, the RDM drive circuit maintaining a resonance of the RDM by producing a signal at the output which is modified by feedback from a signal at the input.

47. The gyroscope of claim 46, in which the rate determining circuit comprises:

a) a phase adjuster having an input coupled to the output of the RDM sense circuit and an output providing a signal which is approximately 90 degrees phase shifted from a signal present at the input;

b) a multiplier having a first input coupled to the output of the TSM sense circuit, a second input coupled to the output of the phase adjuster, and an output providing a signal which is the product of the signals on the first input and the second input; and c) a low-pass filter having an input coupled to the output of the multiplier and an output having a low frequency signal, the output of the low-pass filter being the output of the rate determining circuit.

48. The gyroscope of claim 46, in which the RDM drive circuit comprises:

a) a 90 degree phase shifter having an input coupled to the output of the RDM sense circuit and an output;

b) a voltage limiter having an input coupled to the output of the 90 degree phase shifter, and an output;

the output of the voltage limiter being coupled to the RDM electrostatic levitation actuators through a summing junction with a DC potential.

49. The gyroscope of claim 46, in which the RDM drive circuit further comprises a bias input, such that a DC bias voltage at the bias input applies a DC bias voltage to the RDM actuator, adjusting a resonant frequency of the RDM.

50. The gyroscope of claim 46, in which the signal processing circuit is in the form of an integrated circuit.

51. The gyroscope of claim 50 in which the a first substrate containing the movable body is covered by a second substrate with a seal and a standoff between the first and second substrate provided by a glass frit.

52. the gyroscope of claim 51, in which the integrated circuit and the first and second substrates are packaged together in one hybrid package.

53. The gyroscope of claim 27, in which the a first substrate containing the movable body is covered by a second substrate with a seal and a standoff between the first and second substrate provided by a glass frit.

54. A silicon angular rate gyroscope comprising:

a substrate, a movable body comprised of a planar arrangement of high-aspect ratio single-crystal silicon beams forming an open cellular structure, the body comprising:

a torque summing member (TSM) mounted to the substrate by flexures that substantially restrict motion of the TSM to torsional oscillations about an output axis, and a rotor driven member (RDM) mounted to the TSM by flexures that substantially restrict motion of the RDM to torsional oscillations about a spin axis, the movable body having a plurality of electrically isolated regions of silicon which are mechanically connected but electrically isolated by transverse segments formed from a dielectric material, forming transducers for sensing the motion of the TSM and driving the motion of the RDM.

\* \* \* \* \*

UNITED STATES PATENT AND TRADEMARK OFFICE
CERTIFICATE OF CORRECTION

PATENT NO. : 6,626,039 B1
DATED : September 30, 2003
INVENTOR(S) : Adams et al.

It is certified that error appears in the above-identified patent and that said Letters Patent is hereby corrected as shown below:

<u>Title page,</u>
Item [73], Assignee, should read as follows:
-- [73] Assignee: Kionix, Inc.
Ithaca, New York, and

Millisensor Systems and Actuators, Inc.
West Newton, Massachusetts

Signed and Sealed this

Second Day of December, 2003

JAMES E. ROGAN
*Director of the United States Patent and Trademark Office*